April 1, 1958
H. V. HANSEN
2,828,679
MARKER HINGE
Filed Dec. 17, 1954
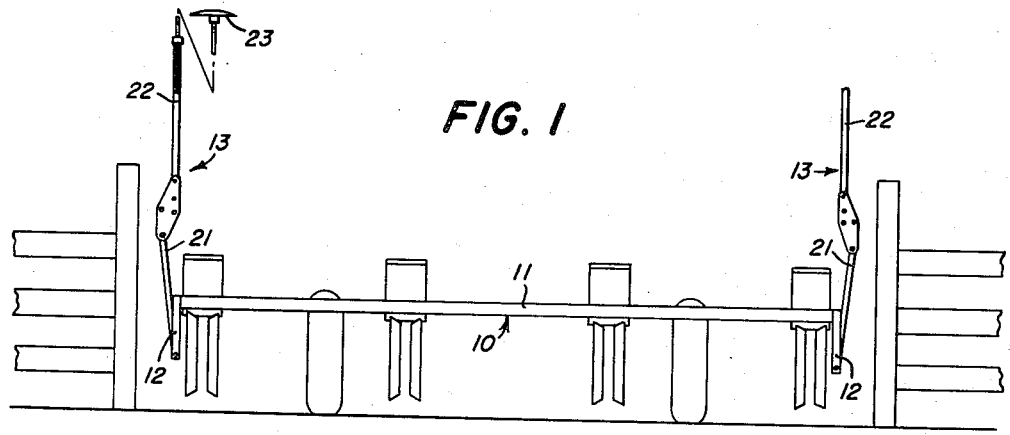
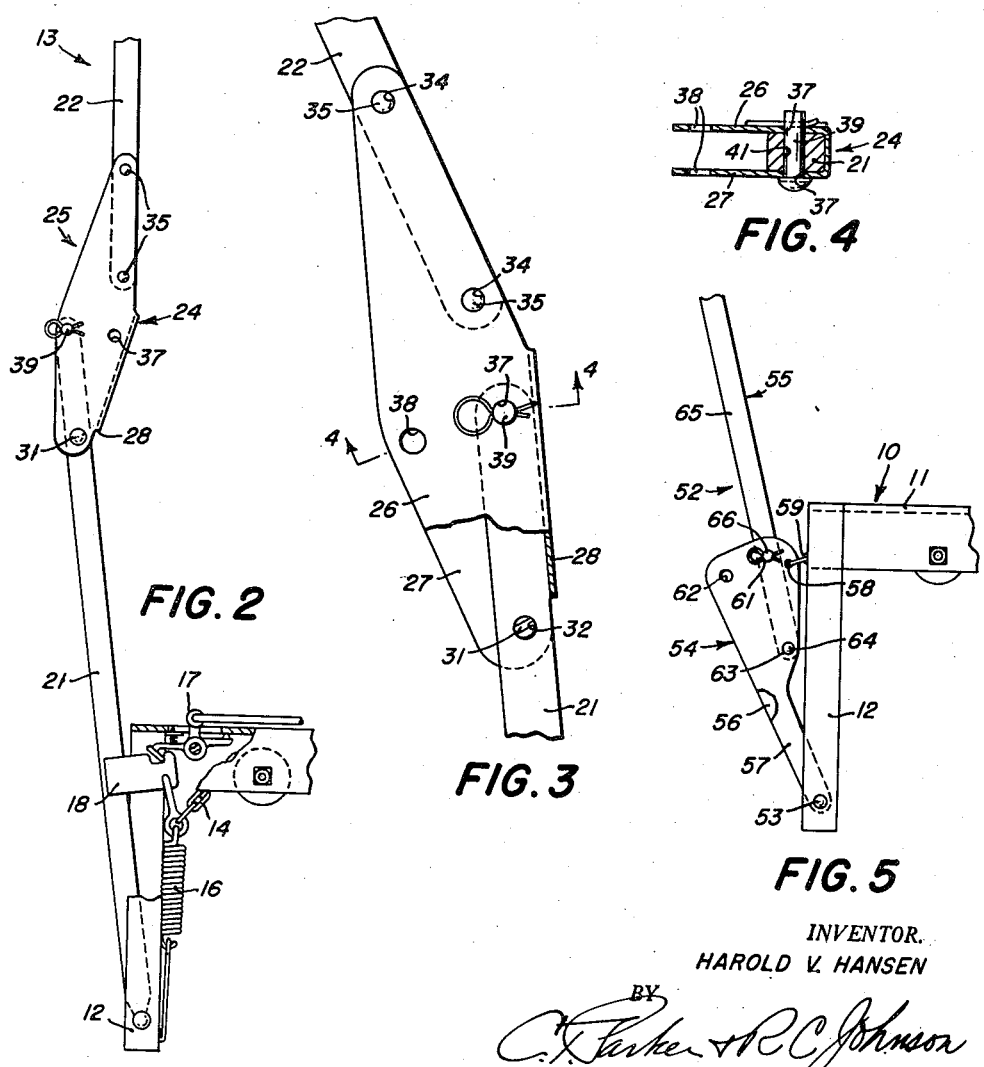
INVENTOR.
HAROLD V. HANSEN
BY
C. F. Parker & R. C. Johnson
ATTORNEYS United States Patent Office 2,828,679
Patented Apr. 1, 1958

2,828,679

MARKER HINGE

Harold V. Hansen, Hillsdale, Ill., assignor to Deere & Company, Moline, Ill., a corporation of Illinois Application December 17, 1954, Serial No. 476,014

6 Claims. (Cl. 97—230)

The present invention relates generally to agricultural implements and more particularly to new and improved marker means for such implements as planters and the like that utilize marks made in the soil for guiding purposes on the next round.

The object and general nature of the present invention is the provision of a new and improved marker construction for planters and the like, in which the marker may be arranged so as not to interfere with the passage of the implement through gates and other narrow spaces, and whereby the implement may be operated close to fences and other obstructions.

More particularly, it is a feature of this invention to provide a marker arm construction in which the marker arm may readily be raised and lowered by suitable means on the planter, but which may be arranged so that the marker arm means extends generally vertically and does not interfere with passage of the planter, as during transport, through narrow spaces, such as gates, narrow lanes and the like, and a further feature of this invention is the provision of means providing a two-part marker arm, with associated means whereby the outer marker arm section may be disposed in two optional positions relative to the inner marker arm part whereby, in the outer position, raising and lowering of the marker arm means is not interfered with, but in the inner position, the marker arms may be disposed generally vertically, or even laterally inwardly of a vertical position, so as not to interfere with passage of the implement close to fences, through narrow spaces and the like.

These and other objects and advantages of the present invention will be apparent to those skilled in the art after a consideration of the following detailed description of the preferred structure, in which the principles of the present invention have been incorporated, taken in conjunction with the accompanying drawings in which such preferred structure has been illustrated.

In the drawings:

Fig. 1 is a fragmentary rear view, showing the marker arm construction arranged for passage through narrow spaces or the like, the marker arm construction being arranged so as to permit operation, usually in transport or planting position, close to adjacent obstructions, such as gate posts, fences, or the like.

Fig. 2 is a fragmentary enlarged view showing one form of the hinge construction by which the inner and outer marker arm sections are interconnected for passage through narrow spaces.

Fig. 3 is a view similar to Fig. 2 showing the marker arm disposed in its raised position but arranged for normal operation, ready to be dropped when a mark is to be made in the ground during planting.

Fig. 4 is a sectional view taken along the line 4—4 of Fig. 3.

Fig. 5 is a view similar to Fig. 2, showing a modified form of the present invention, with the markers arranged for passage through narrow spaces.

Referring now to the drawings, particularly Figs. 1–3, the marker arm construction of the present invention has been shown as incorporated in a four-row planter of the type shown in U. S. Patent 2,376,464, issued May 22, 1945 to C. H. White, to which reference may be made if necessary. A four-row planter is, in the first place, a fairly wide implement, and, in the second place, the marker arms therefor are also fairly long. Additionally, such arms are generally arranged to be dropped by gravity from a raised or transport position, and in that case it is therefore necessary that the arms extend an appreciable amount laterally outwardly from a truly vertical position, thus requiring more space than would otherwise be necessary when passing through gates, along narrow lanes, close to obstructions, and the like.

As shown in Fig. 1, the frame of the planter in which the principles of the present invention have been incorporated is indicated in its entirety by the reference numeral 10 and includes a main transverse frame bar 11 and a depending standard section 12, there being one of such sections at each end of the transverse frame bar 11. The standard 12 provides a pivotal support for the marker arm means, indicated in its entirety by the reference numeral 13, at that side of the implement. Additionally, the planter frame 10 also carries marker arm raising and lowering means, represented in Fig. 2 by the chain 14 that at its outer end is connected, as through cushioning spring means 16, with the marker arm means 13. The present invention is not particularly concerned with the particular details of the raising and lowering means, it being sufficient for the purposes of the present disclosure to note that such raising means may take the form shown in the above-mentioned White patent. In an arrangement of this kind, the chain 14 is pulled laterally inwardly when it is desired to raise the marker arm means, and in the raised position of the latter, a latch 17 engages a notched bracket 18 for the purpose of holding the marker arm means 13 in an elevated position. However, the marker arm means extends laterally outwardly as well as upwardly, so that when the chain 14 is released, the marker arm means 13 drops to its marking position under the action of gravity.

For the reasons mentioned above, when the implement is required to be moved through a narrow space, such as a narrow gate or the like, it is frequently desirable to be able to swing the marker arm means, or at least the outer section thereof, up to a generally vertical position so as to reduce the over-all width of the implement, and the means provided by the present invention for this purpose will now be described.

The marker arm means 13 includes a lower or inner marker arm section 21 and an outer or upper marker arm section 22, the outer end of the section 22 carrying the usual marking element, which may be in the form of a disk 23. The outer or upper section 22 is swingably connected with the lower or inner marker arm section 21 by hinge means 25 that comprises a bracket 24 which includes spaced apart plate portions 26 and 27, the bracket being generally U-shaped in section as shown in Fig. 4, the plate portions 26 and 27 being connected by a bight portion 28. Adjacent the latter portion, the plate portions 26 and 27 are apertured to receive a pivot member 31 that extends through an opening 32 adjacent the upper or outer end of the lower or inner marker arm section 21. The opposite ends of the plate portions 26 and 27 are provided with a pair of openings 34 in which bolts 35 or other suitable fastening means are disposed and are adapted to secure, as by a clamping action, the lower or inner end of the outer marker arm section 22, the latter being apertured to receive the fasteners 35. Thus, the plate portions 26 and 27, and associated parts, move with and serve as a part of the outer marker section 22.

Intermediate their ends, the plate portions 26 and 27 are provided with two sets of aligned apertures 37 and 38 in either set of which a detachable pin 39 may be disposed, the outermost end of the associated inner marker arm section 21 being provided with an aperture 41 to receive the pin in either of its positions.

As will be seen by comparing Figs. 2 and 3, in the normal position (Fig. 3), the pin 39 is disposed in the openings 37 adjacent the bight portion 28 of the bracket 25 and the opening 41 in the outer end of the lower marker arm section 21. This disposes the upper marker arm section 22 in an upwardly and outwardly extending position whereby, upon the release of the latch 17, the marker arm will immediately fall to the ground. However, if it should be desired to pass through a narrow gateway or the like, in which case the outwardly extending marker arms might strike the adjacent gate post or collide with some other object nearby, all that it is necessary to do to materially decrease the over-all width of the implement, so as to permit the latter to pass through narrower spaces and the like, is to take out the pin 39, swing the upper marker arm section 22 into a vertical or even past its vertical position, and then re-insert the pin in the openings 38 and through the opening 41. This locks the marker arm section 22 in its new position in which it does not extend laterally outwardly any farther than or substantially no farther than adjacent portions of the planter. After the narrow space has been passed, the upper marker arm sections 22 may be restored to their normal position by a reversal of the procedure just outlined.

Another form of the present invention is shown in Fig. 5. Referring now to these figures, the planter frame is the same as described above, carrying the downwardly extending standard 12 to which the marker arm means 52 of this form of the invention is pivotally connected, as by a pivot pin 53. The marker arm means 52 includes a lower or inner section 54 and an outer or upper section 55. The lower section 54 comprises a pair of elongated plates 56 and 57 apertured at their lower ends to receive the pivot pin 53 and at their upper ends carrying any kind of suitable connector 58 by which a lifting chain 59 or the like is connected with the marker arm means 52. The upper end of each of the two plates 56 and 57 carries a pair of apertures 61 and 62, spaced apart laterally, and an intermediate aperture 63. A pivot member 64 is disposed in the apertures 63 and pivotally receives the lower end of the bar 65 that comprises the principal portion of the upper marker arm section 55. Above the pivot 64, the marker arm bar 65 is apertured to receive a pin 66 that is insertable in either pair of registering openings 61 and 62 and the associated opening in the marker arm bar 65, whereby the latter may be connected to the lower marker arm section 54 in either of two positions, one disposing the upper marker arm section 55 in a generally vertical position so as to clear adjacent obstructions and the like, and the other being in an upwardly and laterally outwardly extending position whereby when the marker arm latch is released, or the pull on the lifting chain 59 relaxed, the marker arm means drops immediately to the ground without unnecessary delay. In this form of the invention, the operation of changing the position of the upper marker arm section 55 relative to the lower section 54 is substantially the same as that described above in connection with Figs. 1–3, and therefore such procedure need not be repeated.

While I have shown and described above the preferred structure in which the principles of the present invention have been incorporated, it is to be understood that my invention is not to be limited to the particular details, shown and described above, but that, in fact, widely different means may be employed in the practice of the broader aspects of my invention.

What is claimed is:

1. In a planter including a frame, a marker arm construction comprising a lower arm section pivotally connected at its lower end with said frame and swingable from a generally upwardly extending position to a generally laterally outwardly extending position, an upper marker arm section, means swingably connecting the upper marker arm section to the lower marker arm section, said means comprising a pair of plate portions fixed on opposite sides of one of said marker arm sections and pivotally connected with the other marker arm section so that an end portion of said other marker arm section is disposed movably between said plate portions, and means connected between the latter and said last-mentioned end for locking said marker arm sections together in selected positions.

2. The invention set forth in claim 1, further characterized by said marker arm section connecting means including a plurality of apertures in at least one of said plate portions and a cooperating portion of the marker arm section to which said plate portions are pivotally connected, and a detachable member insertable in selected openings.

3. In a planter including a frame, a marker arm construction comprising an inner marker arm section pivoted to said frame and swingable relative to the latter between marker-lowered and marker-raised positions, an outer marker arm section, a pair of plate portions carried by the inner end of said outer marker arm section and overlapping the outer end of the inner marker arm section, means pivotally connecting said plate portions to said inner arm section, and means carried by the latter and said plate portions for locking the outer marker arm section in either of two positions relative to the inner arm section and laterally relative to the planter frame.

4. The invention set forth in claim 3, further characterized by said plate portions being formed on a bracket member that is U-shaped in section adjacent one end, the plate portions at the other end of the bracket being fixedly secured to the inner end of the outer marker arm section.

5. In a planter including a frame, a marker arm construction comprising a lower arm section pivotally connected at its lower end with said frame and swingable from a generally upwardly extending position to a generally laterally outwardly extending position, an upper marker arm section, one of said sections having plate portions overlapping and disposed on opposite sides of the adjacent end of the other section, means pivoting said other section to said plate portions whereby a portion of said other section moves to different portions between said plate portions, and means extending through said plate portions and said other section to fix said other section in selected positions relative to said plate portions.

6. In a planter including a frame, a marker arm construction comprising a lower arm section pivotally connected at its lower end with said frame and swingable from a generally upwardly extending position to a generally laterally outwardly extending position, an upper marker arm section, one of said sections carrying apertured means, a part on the other of said marker arm sections having plate portions overlapping and disposed on opposite sides of said apertured means, and a bight portion interconnecting said plate portions and receiving the adjacent edge of the associated marker arm section, means pivoting said one section to said plate portions whereby said apertured means moves to different portions between said plate portions, and means extending through said plate portions and said apertured means to fix said other section in selected positions relative to said plate portions.

References Cited in the file of this patent

UNITED STATES PATENTS

| | | |
|---|---|---|
| 602,903 | Haworth | Apr. 26, 1898 |
| 1,148,791 | Nelson | Aug. 3, 1915 |
| 1,164,393 | Randolph | Dec. 14, 1915 |
| 1,915,919 | Bryant | June 27, 1933 |